United States Patent
Gray

(10) Patent No.: US 10,486,933 B2
(45) Date of Patent: Nov. 26, 2019

(54) BELT PRESS FILTER BELT CHANGING ASSEMBLY

(71) Applicant: Darrick Gray, Kokomo, IN (US)

(72) Inventor: Darrick Gray, Kokomo, IN (US)

(*) Notice: Subject to any disclaimer, the term of this patent is extended or adjusted under 35 U.S.C. 154(b) by 494 days.

(21) Appl. No.: 15/058,276

(22) Filed: Mar. 2, 2016

(65) Prior Publication Data

US 2016/0256802 A1 Sep. 8, 2016

Related U.S. Application Data

(60) Provisional application No. 62/126,735, filed on Mar. 2, 2015.

(51) Int. Cl.

| B01D 33/056 | (2006.01) |
|---|---|
| B65H 75/28 | (2006.01) |
| B01D 33/00 | (2006.01) |
| B65H 19/28 | (2006.01) |
| B01D 33/46 | (2006.01) |

(52) U.S. Cl.
CPC ............ B65H 75/28 (2013.01); B01D 33/00 (2013.01); B01D 33/056 (2013.01); B01D 33/463 (2013.01); B65H 19/28 (2013.01); B65H 2301/41342 (2013.01)

(58) Field of Classification Search
CPC .................. B65H 75/28; B65H 19/28; B65H 2301/41342; B01D 33/463; B01D 33/056
See application file for complete search history.

(56) References Cited

U.S. PATENT DOCUMENTS

| 1,778,342 A * | 10/1930 | Thompson ........... B01D 33/042 100/74 |
|---|---|---|
| 6,547,218 B2 * | 4/2003 | Landy ..................... B60P 7/083 24/68 CD |
| 9,751,449 B2 * | 9/2017 | Bermes ................... B25B 25/00 |

OTHER PUBLICATIONS

Calvin College Team-17, "Sludge Treatment", 2003 <https://www.calvin.edu/academic/engineering/senior-design/SeniorDesign03-04/Team17/st.html> date retrieved: May 16, 2016.

* cited by examiner

*Primary Examiner* — Rick K Chang
(74) *Attorney, Agent, or Firm* — Tyler B. Droste; Gutwein Law

(57) ABSTRACT

A belt press filter belt changing assembly that includes two upright members, a wrap bar, a dowel rod, and a means of temporarily affixing the assembly to a belt press filter. The belt press filter changing assembly facilitates rapid, efficient, and safe changing of the belt press filter's continuous belts while requiring less personnel using less physical exertion than current solutions.

13 Claims, 6 Drawing Sheets

Figure 1 – prior art

BELT PRESS FILTER BELT CHANGING ASSEMBLY

CROSS-REFERENCE TO RELATED APPLICATION

This U.S. patent application claims priority to U.S. Provisional Application No. 62/126,735 filed Mar. 2, 2015, the disclosure of which is considered part of the disclosure of this application and is hereby incorporated by reference in its entirety.

FIELD OF THE INVENTION

This invention relates generally to a belt press filter tool and a method for changing the belts in a belt press filter.

BACKGROUND

A belt press filter is an industrial machine, used for solid/liquid separation, such as dewatering of sludges in the chemical industry, mining processes, and water treatment. Belt press filters are also used in the production juices and wine. Filtration is primarily achieved by passing a pair of filtering cloths or belts through a system of rollers. The system takes a sludge or slurry as a feed and separates it into a filtrate and a solid cake.

Belt press filters comprise a frame and an assembly of rollers that support and drive an upper continuous belt and a lower continuous belt that are in operable communication with each other. The belts are permeable to allow the extrusion of the liquid therethrough. The mixture is first placed on the lower belt, then sandwiched between the upper and lower belts. The belts and the retained mixture then pass through a wedge section where the mixture is distributed between the belts, and an initial volume of liquid is removed. The belts then pass through a series of progressively smaller diameter rollers where the retained mixture is compressed for further liquid removal. The belts are then separated and the dry "cake" is removed from the belts, generally by a scraping apparatus. The belts then pass through one or more belt washers, after which the process is repeated. The liquid from the extrusion and belt washing processes are collected for disposal.

Belt press filters are used in a range of areas, including urban sewage and wastewater treatment, metallurgy and mining, steel plants, coal plants, breweries, dyeing, tanneries, as well as chemical and paper factories. As such, the mixtures processed by the belt press filter can include mixed sludge, mineral slurry, dust sediment, selected coal washing mud, biological sludge, primary sludge, and straw, wood or waste paper pulp.

The choice of belt is critical to the operation of the belt press filter, wherein there are various materials and weaves available. Lighter cloths produce a clearer filtrate and do not block as rapidly, but their durability and life span is significantly shorter than heavier cloths. Both seamless and seamed belts are available. Seamed belts wear faster at the seam and cause wear at the rollers. Zipper-type and clipper-type seamed belts are also available, with the zipper-type having a longer life span as they provide more continuity.

Given the abrasive or caustic nature of the mixtures being processed, the belts themselves must be periodically changed. Further, considering the complex nature of the belt press filter, the belt changing process is a highly complicated, laborious, and often dangerous process that traditionally requires a team of personnel and an high level of physical exertion.

There exists a need in the industry to quickly and safely change zipper type belts using fewer personnel.

SUMMARY OF THE INVENTION

In one aspect of the invention, a belt changing assembly for a belt press filter comprising two upright members, each upright member including a wrap bar housing member, a dowel rod housing member, and a press-mating member that further includes a joining feature; a wrap bar including a handle end, a distal end, and a cylindrical portion between the handle end and the distal end, the cylindrical portion including two embedded zipper mating members; and a dowel rod is provided. In another aspect of the invention, a process for changing a belt press filter's belts is provided using the belt changing assembly disclosed herein.

DETAILED DESCRIPTION

Figure 1:
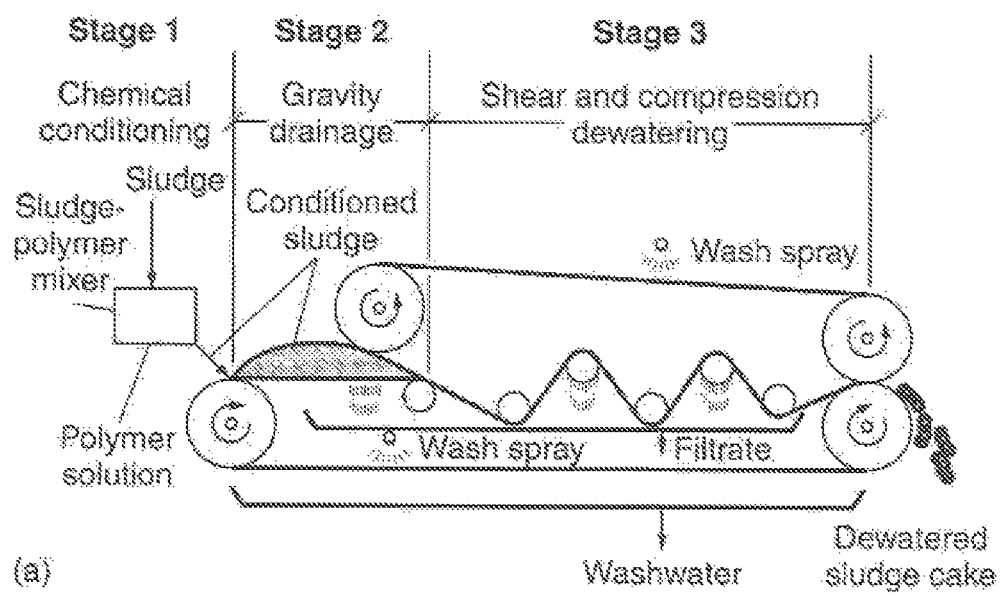
FIG. 1 is a prior art schematic of a belt press filter.

As shown in FIG. 1, a belt press filter is an industrial machine used to filter water out of a feedstock by pressing the feedstock between at least two porous belts that are passed through a system of rollers. While the belts may be seamless or seamed, more commonly, the belts are made continuous via zippers or clippers that join a previously discontinuous belt into a continuous belt.

Figure 2:
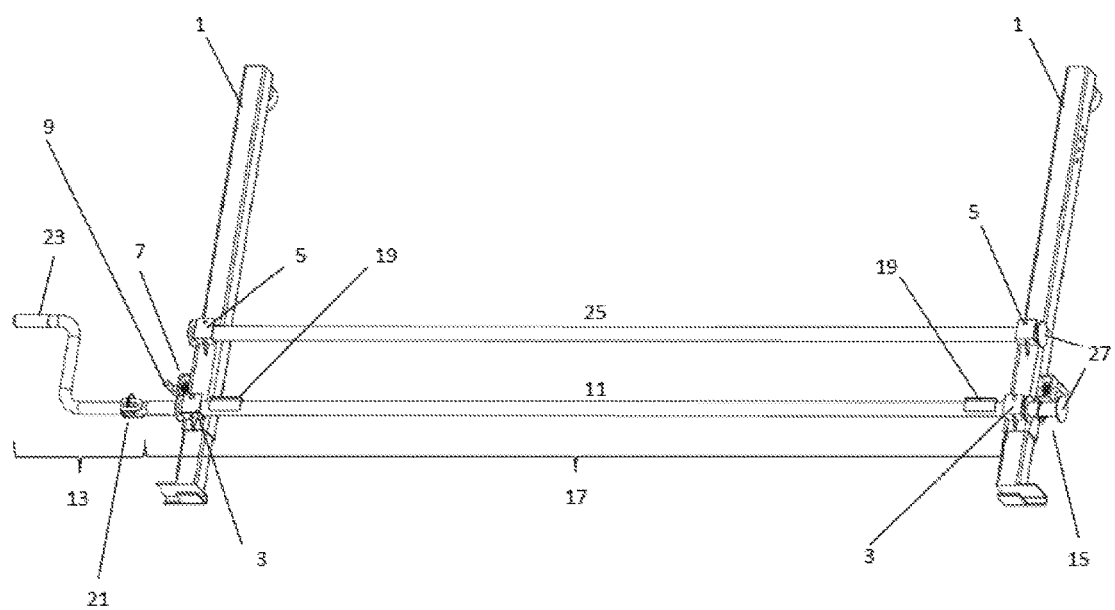
FIG. 2 is a perspective view of an exemplary embodiment of a belt changing assembly of the invention.

As seen in FIG. 2, a belt changing assembly to assist in changing the belts is provided herein. In one exemplary embodiment, the belt changing assembly has a two upright members 1, each upright member 1 can include a wrap bar housing member 3, a dowel rod housing member 5, and a press-mating member 7 that further includes a joining feature 9. The joining feature 9, as more clearly seen in FIG. 3, may be a U-shaped fold that is configured to engage a flat lip portion of the belt press filter. The joining feature 9 can further have a hole configured to facilitate a mechanical joining device being placed there through, such as a bolt.

Figure 3:
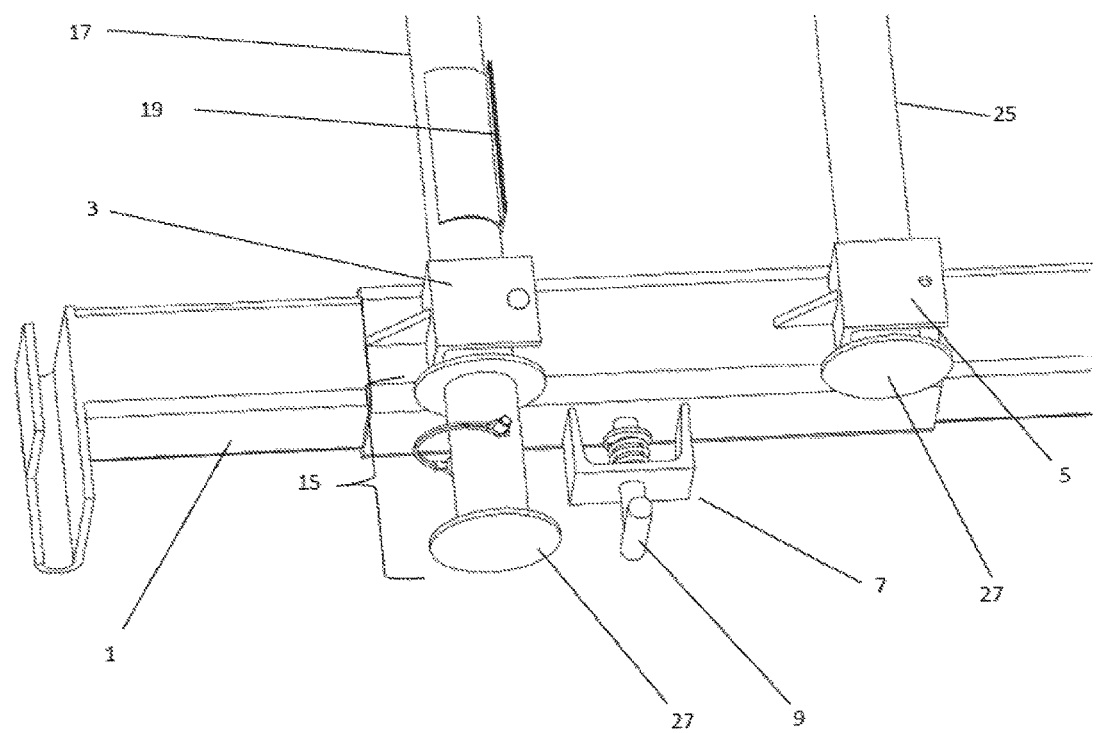
FIG. 3 is a close perspective view of the distal end of an exemplary embodiment of a belt changing assembly of the invention.
Figure 4:
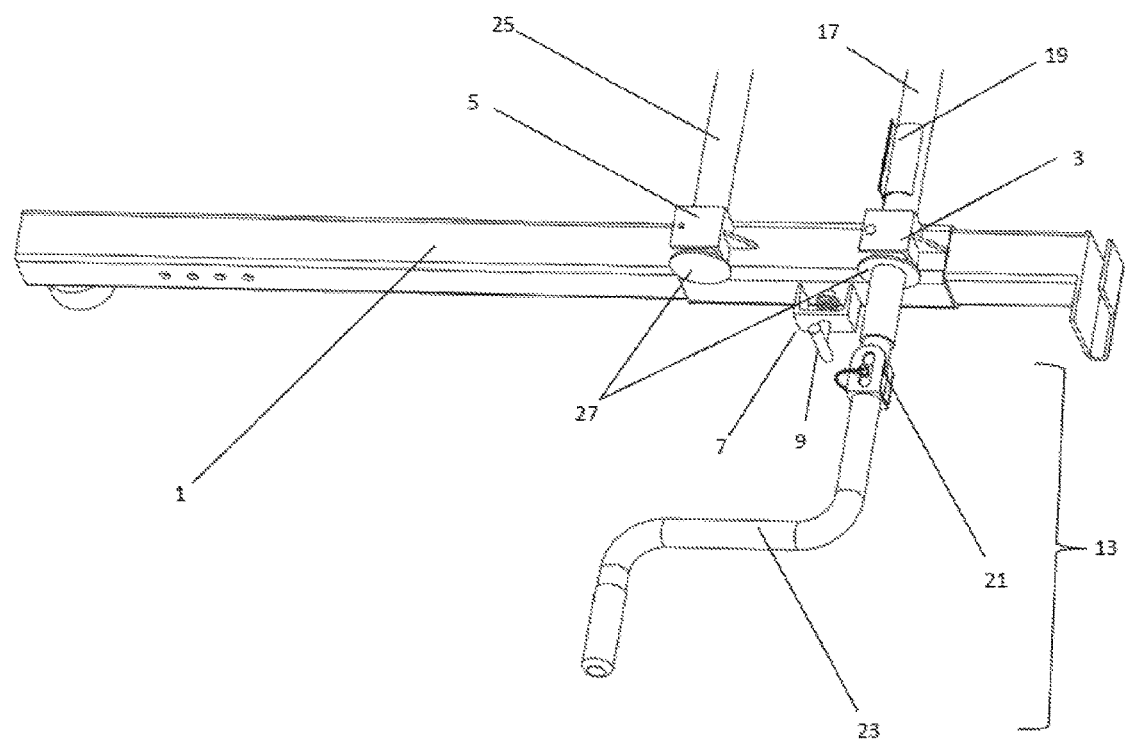
FIG. 4 is a close perspective view of the handle end of an exemplary embodiment of a belt changing assembly at the distal end.

As shown in FIGS. 2-5, the belt changing assembly includes a wrap bar 11. The wrap bar 11 has a handle end 13, a distal end 15, and a cylindrical portion 17 between the handle end 13 and the distal end 15. The cylindrical portion 17 can have at least one embedded zipper mating member 19. As shown in FIG. 2, in one exemplary embodiment of the present invention the cylindrical portion 17 can have two zipper mating members 19 or, optionally, one wide zipper mating member 19. The purpose of these zipper mating members 19 is to interface with the old belt that is to be removed. The wrap bar's handle end 13 may have a hinged feature 21, as seen in FIG. 2 and FIG. 4 that can allow the handle 23 to have a low profile during the belt changing process. Additionally, the handle 23 can be removeable from the handle end 13 of the wrap bar 11. Any suitable means can be used to connect the handle 23 to the handle end 13

Further, the belt changing assembly can include a dowel rod 25 that can interface with the upright members 1. In one embodiment, the upright members 1 are configured with the dowel rod housing members 5 positioned above the wrap bar housing members 3. The dowel rod 25 can be configured to house a new belt that is being installed in the belt press filter. In one exemplary embodiment, the wrap bar 11 and the dowel rod 25 can be modular and can each be formed in a plurality of components that can be coupled together from the complete wrap bar 11 and the complete dowel rod 25. This allows a user to deconstruct these components to more easily store and move the apparatus. The pieces can be coupled together by any suitable means, including but not limited to using male and female joints that are threadedly connected to each other.

In one exemplary embodiment, the wrap bar 11 can be comprised of at least a first bar portion and a second bar portion. One end of the first bar portion can be a threaded male end and one end of the second bar portion can have a threaded female end configured to threadedly connect to the threaded male end. Similarly, the dowel rod 25 can be comprised of at least a first dowel portion and a second dowel portion that can be removeably connected similar to the means used in wrap bar 11 described above. It is understood that both the dowel rod 25 and wrap bar 11 each can be comprised of a single portion or multiple portions as may be required by the user to ensure ease of use and transportation.

Figure 5:
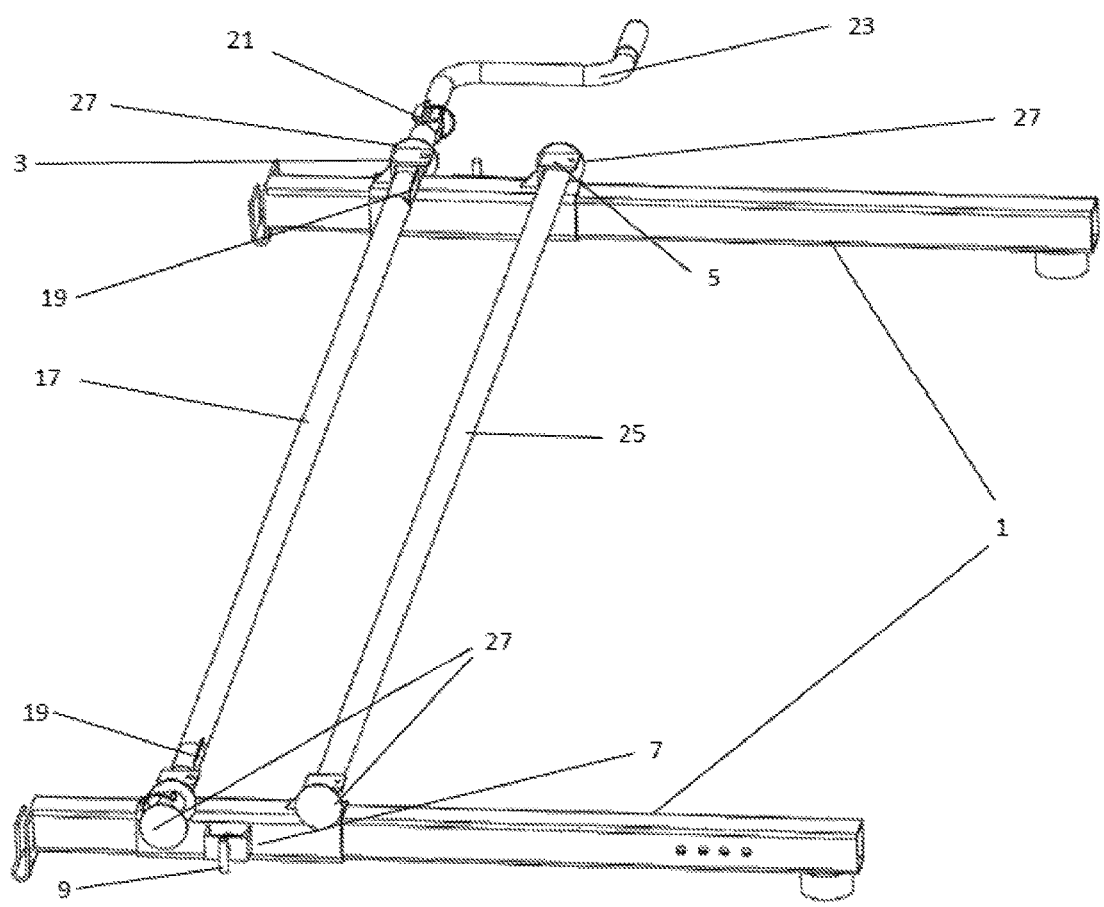
FIG. 5 is a side view of an exemplary embodiment of belt changing assembly looking from the distal end.
Figure 6:
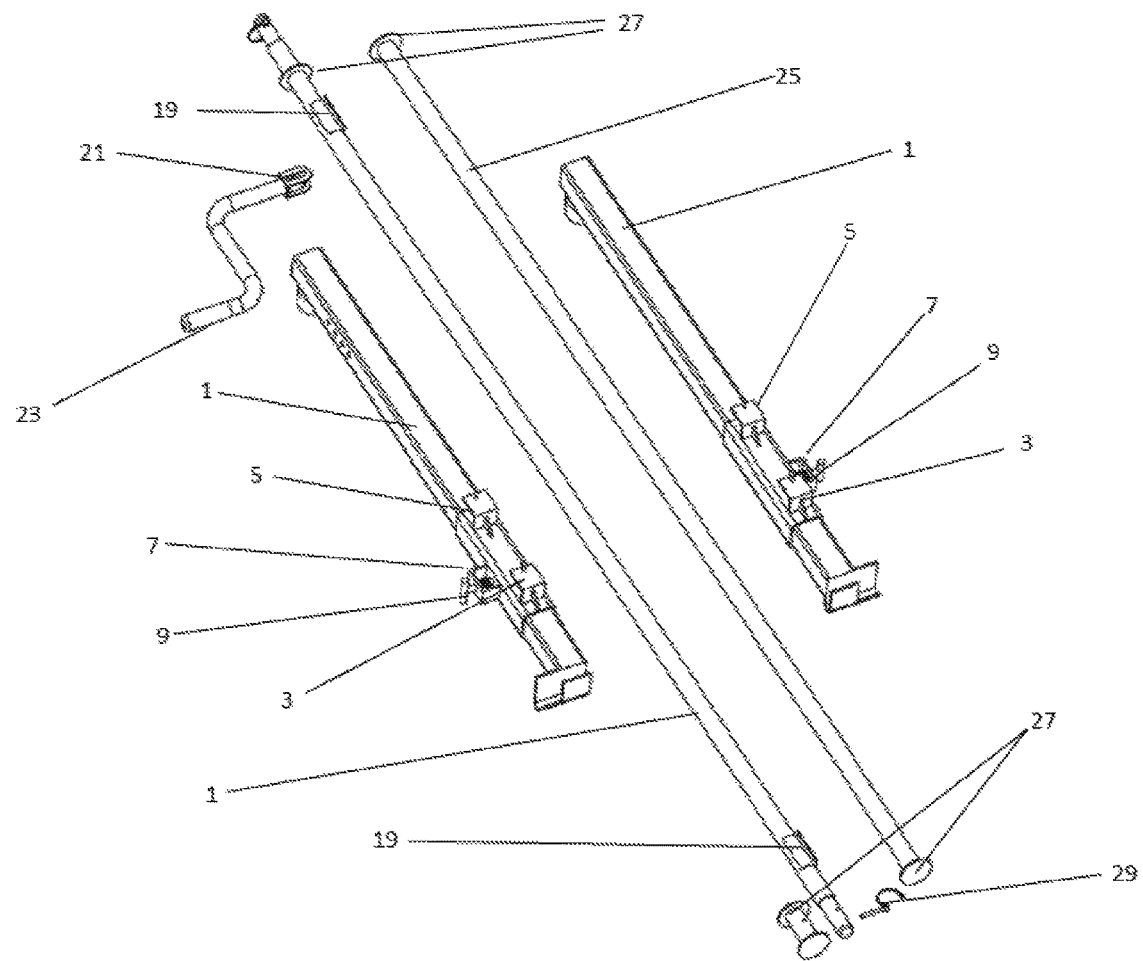
FIG. 6 is deconstructed view of an exemplary embodiment of the belt changing assembly.

As shown in FIG. 3 and FIG. 4 in greater detail, both the cylindrical portion 17 of wrap bar 11 and the dowel rod 25 can include an upright interface features 27 on each end of both the dowel rod 25 and the cylindrical portion 17 of wrap bar 11. These interface features 27 are configured to rotationally interact with the upright member's 1 respective wrap bar housing member 3 and the dowel rod housing member 5. A side view of an exemplary embodiment of the present invention is shown in FIG. 5. The interface features 27, as seen, can be configured to help ensure the wrap bar 11 and dowel rod 25 are maintained in the upright members 1 and are not easily removed if a lateral force is placed on the wrap bar 11 or dowel rod 25. The interface features 27 can be removeable to allow for the wrap bar 11 and the dowel rod 25 to be easily removed from the upright members 1. Any suitable means can be used to connect interface features 27 to wrap bar 11 or dowel rod 25. In one exemplary embodiment, a bolt and cotter pin 29 can be used to secure interface features 27.

INDUSTRIAL USAGE

In application, the belt is first stopped in a location such that the belt zipper is exposed. A joining wire is removed from the zipper so that the belt is rendered discontinuous. Next, the belt changing assembly's upright members 1 are affixed to a lip on the belt press filter, such as a lip on a drip pan of the belt press filter. Specifically, there may be bracket holes found on an emergency stop wire that may be utilized such that a press-mating member on each upright member 1 is affixed, such as via a mechanical joining method such as bolting.

Next, the belt changing assembly's wrap bar 11 is set into place, interfacing with the upright member's respective wrap bar housing members 3. The embedded zipper mating members 19 of the wrap bar 11 are mated with the zipper members of the belt and connected via, for example, a joining wire.

To uninstall the old belt completely, a new belt is first placed on a dowel rod 25 that is set into place on the upright member's respective dowel rod housing members 5. The old belt zipper member and the new belt zipper member are then affixed to one another via a belt change joining wire. Then, as the wrap bar is actuated using, for example, the handle end 13 of the wrap bar, the old belt is removed and the new belt is installed. The final step of the changing process is removing the belt change joining wire, mating the zipper members of the new belt to one another, and installing a new belt joining wire. When complete, the tool is disassembled and removed from the change location.

A significant advantage to the current tool and process is that the old belt is wrapped tightly and uncut, facilitating rapid disposal optionally in the packaging that was received with the new belt.

Another significant advantage to the current tool and method is that the new belt is installed straight and without wrinkle using less personnel, time, and utilizing less physical exertion in a safe and efficient manner.

What is claimed is:

1. A belt changing assembly for a belt press filter comprising:
    two upright members, each upright member including a wrap bar housing member, a dowel rod housing member, and a press-mating member that further includes a joining feature, wherein said upright members are configured to be mechanically joined to the belt press filter using the press mating member;
    a wrap bar including a handle end, a distal end, and a cylindrical portion between the handle end and the distal end, the cylindrical portion including two embedded zipper mating members, wherein said zipper mating members are configured to mate to an existing belt of the belt press filter; and
    a dowel rod.

2. The belt changing assembly of claim 1, wherein the wrap bar is comprised of at least a first bar portion and a second bar portion, wherein the first bar portion and the second bar portion can be removeably coupled together, and wherein the dowel rod is comprised of at least a first dowel portion and a second dowel portion, wherein the first dowel portion and the second dowel portion are removeably coupled.

3. The belt changing assembly of claim 1 wherein the handle end is hinged and said dowel rod is configured to house a new belt for installation onto the belt press filter.

4. The belt changing assembly of claim 1 wherein the cylindrical portion includes two upright interface features, which are configured to rotationally interact with the wrap bar housing member of the respective upright member.

5. The belt changing assembly of claim 1 wherein the dowel rod includes two upright interface features, which are configured to rotationally interact with the dowel rod housing member of the respective upright member.

6. The belt changing assembly of claim 1 wherein the interface features are removeable from said cylindrical portion.

7. The belt changing assembly of claim 1 wherein the handle end further comprises a removeable handle configured to couple to said handle end.

8. A belt changing assembly, comprising:
at least one upright member, wherein said upright member has a wrap bar housing member, a dowel rod housing member, and a press mating member, wherein said upright member is configured to be mechanically joined to a belt press filter using the press mating member, wherein said at least one upright members is configured to interact with said dowel rod housing member positioned above the wrap bar housing members;
a wrap bar, wherein said wrap bar has a handle end, a distal end, and a cylindrical portion between said handle end and distal end, wherein said cylindrical portion further comprises at least one embedded zipper mating members configured to interface with a belt; and
a dowel rod.

9. The belt changing assembly of claim 8, wherein said press mating member further includes a joining feature configured to engage a portion of a belt press filter.

10. The belt changing assembly of claim 8, wherein said handle end is coupled to said cylindrical portion by a hinged feature configured to allow said handle to have a low profile during operation of the assembly.

11. The belt changing assembly of claim 8, wherein the cylindrical portion of said wrap bar further includes an upright interface feature near said handle end and an upright interface feature near said distal end, wherein each upright interface features is configured to rotationally interact with the respective wrap bar housing member of said upright member.

12. The belt changing assembly of claim 11, wherein said upright interface feature is removeable.

13. The belt changing assembly of claim 8, wherein said dowel rod further includes an upright interface feature near each end of said dowel rod.

* * * * *